(12) United States Patent
Yang et al.

(10) Patent No.: US 11,362,341 B2
(45) Date of Patent: Jun. 14, 2022

(54) CATALYST SLURRY FOR FUEL CELLS AND METHOD FOR MANUFACTURING THE SAME

(71) Applicants: Hyundai Motor Company, Seoul (KR); KIA Motors Corporation, Seoul (KR)

(72) Inventors: Ji Hoon Yang, Hwaseong-si (KR); Su Won Seol, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 17/007,635

(22) Filed: Aug. 31, 2020

(65) Prior Publication Data

US 2021/0159509 A1    May 27, 2021

(30) Foreign Application Priority Data

Nov. 26, 2019    (KR) ........................ 10-2019-0153072

(51) Int. Cl.
  *H01M 4/88* (2006.01)
  *H01M 4/86* (2006.01)
  *H01M 4/92* (2006.01)

(52) U.S. Cl.
  CPC ....... *H01M 4/8828* (2013.01); *H01M 4/8605* (2013.01); *H01M 4/8882* (2013.01); *H01M 4/8892* (2013.01); *H01M 4/926* (2013.01)

(58) Field of Classification Search
  CPC .................................................. H01M 4/8828
  See application file for complete search history.

(56) References Cited

U.S. PATENT DOCUMENTS

| 5,861,222 | A | 1/1999 | Fischer | |
|---|---|---|---|---|
| 2004/0053111 | A1* | 3/2004 | Matsumoto | H01B 1/122 429/535 |
| 2013/0157169 | A1* | 6/2013 | Madden | H01M 4/8828 429/535 |
| 2014/0322453 | A1 | 10/2014 | Namba | |
| 2017/0338496 | A1* | 11/2017 | Takahashi | H01M 4/8605 |
| 2018/0254489 | A1 | 9/2018 | Koestner | |
| 2020/0036012 | A1* | 1/2020 | Ye | H01M 4/926 |

FOREIGN PATENT DOCUMENTS

| KR | 100671494 B1 | 1/2007 |
|---|---|---|
| WO | 2012026916 A1 | 3/2012 |
| WO | 2018/064623 A1 | 4/2018 |
| WO | 2018064623 A1 | 4/2018 |
| WO | 2020004848 A1 | 1/2020 |

* cited by examiner

*Primary Examiner* — Brian R Ohara
(74) *Attorney, Agent, or Firm* — McDonnell Boehnen Hulbert & Berghoff LLP

(57) ABSTRACT

Disclosed is a catalyst slurry for fuel cells and a method for manufacturing the same in which two kinds of ionomers having different equivalent weights (EWs) are used such that the respective ionomers may be formed at positions suitable for maximally exhibiting the functions thereof.

20 Claims, 7 Drawing Sheets

CATALYST SLURRY FOR FUEL CELLS AND METHOD FOR MANUFACTURING THE SAME

CROSS-REFERENCE TO RELATED APPLICATIONS

This application claims under 35 U.S.C. § 119(a) the benefit of priority to Korean Patent Application No. 10-2019-0153072 filed on Nov. 26, 2019, the entire contents of which are incorporated herein by reference.

BACKGROUND

(a) Technical Field

The present disclosure relates to a catalyst slurry for fuel cells and a method for manufacturing the same.

(b) Background Art

A polymer electrolyte membrane fuel cell for vehicles may ensure optimum performance under various driving conditions (temperatures/humidities), and particularly, technology for designing an electrode catalyst layer which may appropriately discharge water generated during driving of a fuel cell to prevent flooding is required.

An ionomer included in a cathode catalyst layer serves to transmit protons which react with oxygen to produce electricity. As the equivalent weight (EW) of the ionomer decreases, the number of ion exchangers is increased and thus proton conductivity is increased but discharge of generated water is poor and, as the equivalent weight (EW) of the ionomer increases, proton conductivity is decreased but water discharge characteristics are strong.

In order to compensate for weaknesses and maximize strengths depending on the equivalent weight (EW) of the ionomer, various technologies and inventions which may use different kinds of ionomers having different equivalent weights (EWs) have been developed. However, in such cases, the different kinds of ionomers are simply mixed or are prepared as individual layers and thus effects thereof are limited and restricted.

SUMMARY

The present disclosure has been made in an effort to solve the above-described problems associated with the prior art and it is an object of the present disclosure to provide a catalyst slurry and a method for manufacturing the same in which advantages of two kinds of ionomers having different equivalent weights (EWs) are combined so as to maximize a 3-phase boundary in an electrode and improve discharge characteristics of generated water and carbon corrosion durability.

In one aspect, the present disclosure provides a catalyst slurry for fuel cells including an electrode catalyst formed as catalyst particles including micropores, and an ionomer layer formed on the electrode catalyst, wherein the electrode catalyst includes an outer surface, and mesopores formed to extend inwards from the outer surface to a designated depth, the ionomer layer includes a first ionomer formed on the outer surface of the electrode catalyst in which the micropores are located, and a second ionomer formed on inner surfaces of the mesopores, and an average length of side chains of the second ionomer is longer than an average length of side chains of the first ionomer.

In a preferred embodiment, the catalyst particles may include a support on which a catalyst metal is supported.

In another preferred embodiment, the catalyst metal may include one selected from the group consisting of platinum (Pt), palladium (Pd), iridium (Ir), rhodium (Rh), gold (Au), silver (Ag), cobalt (Co), nickel (Ni) and combinations thereof.

In still another preferred embodiment, the support may include one selected from the group consisting of carbon black, acetylene black, Ketjen black, active carbon, carbon nanotubes, carbon nanofibers, carbon nanowires and combinations thereof.

In yet another preferred embodiment, the support may include the micropores having a size of less than 2 nm.

In still yet another preferred embodiment, the catalyst particles may have a particle diameter of 1 µm or less.

In a further preferred embodiment, the mesopores may include pore inlets which are open from an inside to an outside of the electrode catalyst so as to meet the outer surface of the electrode catalyst, a diameter of the pore inlets may be 2 nm to 50 nm, and a depth of the mesopores may be 2 nm to 200 nm.

In another further preferred embodiment, the first ionomer may have an equivalent weight (EW) of 400 to 800, and include one selected from the group consisting of a polysulfone-based resin, a polyether ketone-based resin, a polyether-based resin, a polyester-based resin, a polybenzimidazole-based resin, a polyimide-based resin and combinations thereof.

In still another further preferred embodiment, the second ionomer may have an equivalent weight (EW) of 800 to 1,200, and include one selected from the group consisting of a polysulfone-based resin, a polyether ketone-based resin, a polyether-based resin, a polyester-based resin, a polybenzimidazole-based resin, a polyimide-based resin and combinations thereof.

In yet another further preferred embodiment, the second ionomer may be formed on the outer surface of the electrode catalyst in which the micropores are located.

In still yet another further preferred embodiment, the electrode catalyst may further include a water electrolysis catalyst supported on the inner surfaces of the mesopores, the water electrolysis catalyst may be mixed with the second ionomer, and the water electrolysis catalyst may include a metal catalyst selected from the group consisting of iridium (Ir), ruthenium (Ru) and a combination thereof, or an oxide thereof.

In a still further preferred embodiment, an amount of the water electrolysis catalyst supported on the inner surfaces of the mesopores may be 10 parts by weight to 50 parts by weight based on 100 parts by weight of the electrode catalyst.

In another aspect, the present disclosure provides a method for manufacturing the above catalyst slurry for fuel cells, the method including preparing a starting material including the catalyst particles, the first ionomer and a pore former, acquiring an intermediate product, in which an outer surface of a composite including the catalyst particles and the pore former is coated by the first ionomer, by heat-treating the starting material, acquiring the electrode catalyst having the mesopores therein by removing the pore former from the intermediate product, and coating the inner surfaces of the mesopores with a water electrolysis catalyst and the second ionomer.

In a preferred embodiment, the pore former may include silica having a particle diameter of 5 nm to 50 nm.

In another preferred embodiment, a content of the pore former may be 10 parts by weight to 50 parts by weight based on 100 parts by weight of the catalyst particles.

In still another preferred embodiment, the starting material may include 60 wt % to 80 wt % of the catalyst particles and the pore former and 20 wt % to 40 wt % of the first ionomer.

In yet another preferred embodiment, the starting material may be prepared by dispersing the catalyst particles and the pore former in a solvent and then dispersing the first ionomer in an acquired resultant material.

In still yet another preferred embodiment, the intermediate product may be acquired by heat-treating the starting material at a temperature of 100° C. to 140° C. for 2 hours to 4 hours.

In a further preferred embodiment, the pore former may be removed by putting the intermediate product into an alkaline solution and then refluxing an acquired mixture.

In another further preferred embodiment, the inner surfaces of the mesopores may be coated with the second ionomer by dispersing the electrode catalyst, the water electrolysis catalyst and the second ionomer in a solvent.

Other aspects and preferred embodiments of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
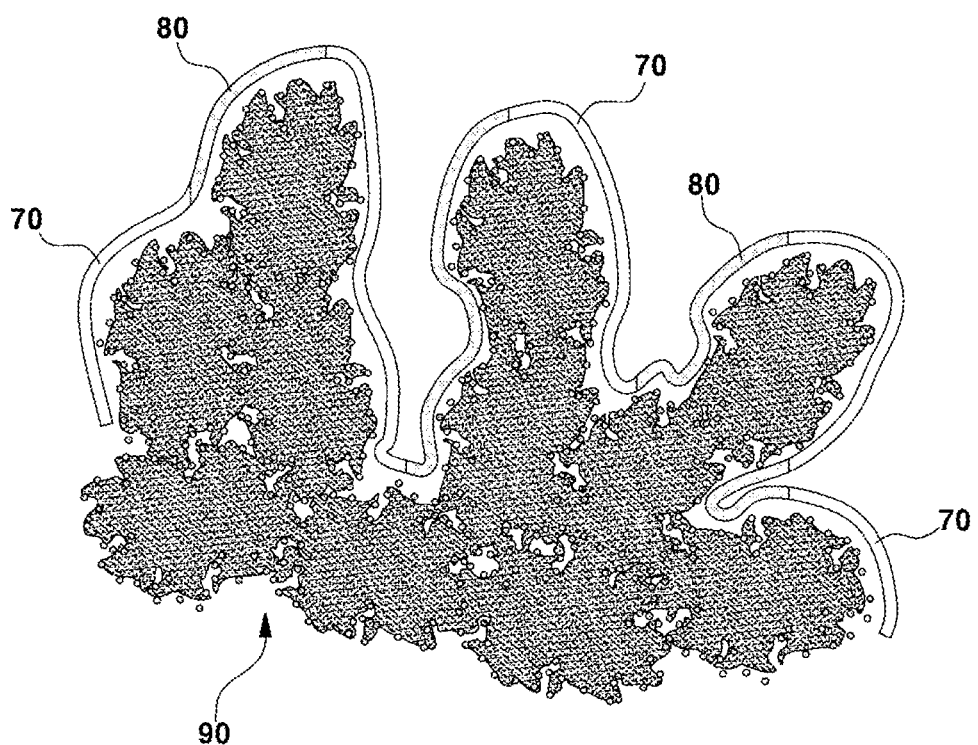
FIG. 1 is a view schematically illustrating a conventional electrode catalyst slurry.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawings.

DETAILED DESCRIPTION

Hereinafter reference will be made in detail to various embodiments of the present disclosure, examples of which are illustrated in the accompanying drawings and described below. While the disclosure will be described in conjunction with exemplary embodiments, it will be understood that the present description is not intended to limit the disclosure to the exemplary embodiments. On the contrary, the disclosure is intended to cover not only the exemplary embodiments, but also various alternatives, modifications, equivalents and other embodiments within the spirit and scope of the disclosure as defined by the appended claims.

In the following description of the embodiments, the same elements are denoted by the same reference numerals even though they are depicted in different drawings. In the drawings, dimensions of structures are exaggerated as compared to actual dimensions thereof, for clarity of description. In the following description of the embodiments, terms, such as "first", "second", etc., may be used to describe various elements but do not limit the elements. These terms are used only to distinguish one element from other elements. For example, a first element may be named a second element and similarly, the second element may be named the first element, within the spirit and scope of the disclosure. Singular expressions may encompass plural expressions, unless they have clearly different contextual meanings.

In the following description of the embodiments, terms, such as "including", "having", etc., will be interpreted as indicating the presence of characteristics, numbers, steps, operations, elements or parts stated in the description or combinations thereof, and do not exclude the presence of one or more other characteristics, numbers, steps, operations, elements, parts or combinations thereof, or possibility of adding the same. In addition, it will be understood that, when a part, such as a layer, a film, a region or a plate, is said to be "on" another part, the part may be located "directly on" the other part or other parts may be interposed between both parts. In the same manner, it will be understood that, when a part, such as a layer, a film, a region or a plate, is said to be "under" another part, the part may be located "directly under" the other part or other parts may be interposed between both parts.

All numbers, values and/or expressions representing amounts of components, reaction conditions, polymer compositions and blends used in the description are approximations in which various uncertainties in measurement generated when these values are acquired from essentially different things are reflected and thus, it will be understood that they are modified by the term "about", unless stated otherwise. In addition, it will be understood that, if a numerical range is disclosed in the description, such a range includes all continuous values from a minimum value to a maximum value of the range, unless stated otherwise. Further, if such a range refers to integers, the range includes all integers from a minimum integer to a maximum integer, unless stated otherwise.

An ionomer used in a fuel cell serves to transmit protons in an electrode. Because properties of the ionomer are changed according to the equivalent weight (EW) thereof, which ionomer is used to form an electrode is important. Specifically, when the equivalent weight (EW) of the ionomer is low, the number of ion exchangers is large and thus proton conductivity is increased, but the ionomer has high hydrophilicity and thus does not effectively discharge water. On the other hand, when the equivalent weight (EW) of the ionomer is high, proton conductivity is low, but the ionomer has high hydrophobicity and thus effectively discharges water. Therefore, technology in which two kinds of ionomers having different equivalent weights (EWs) are used to form an electrode has been proposed.

FIG. 1 is a view schematically illustrating a conventional electrode catalyst slurry. Specifically, an ionomer 70 having a low equivalent weight (EW) and an ionomer 80 having a high equivalent weight (EW) are mixed, and an electrode catalyst 90 is coated with an acquired mixture. However, in this case, the ionomers 70 and 80 are randomly adhered to the surface of the electrode catalyst 90, and thus acquirable effects are limited.

In the present disclosure, in order to overcome the conventional limitations, two kinds of ionomers having different equivalent weights (EWs) are used but the respective ionomers may be formed at positions suitable for maximally exhibiting the functions thereof.

Figure 2:
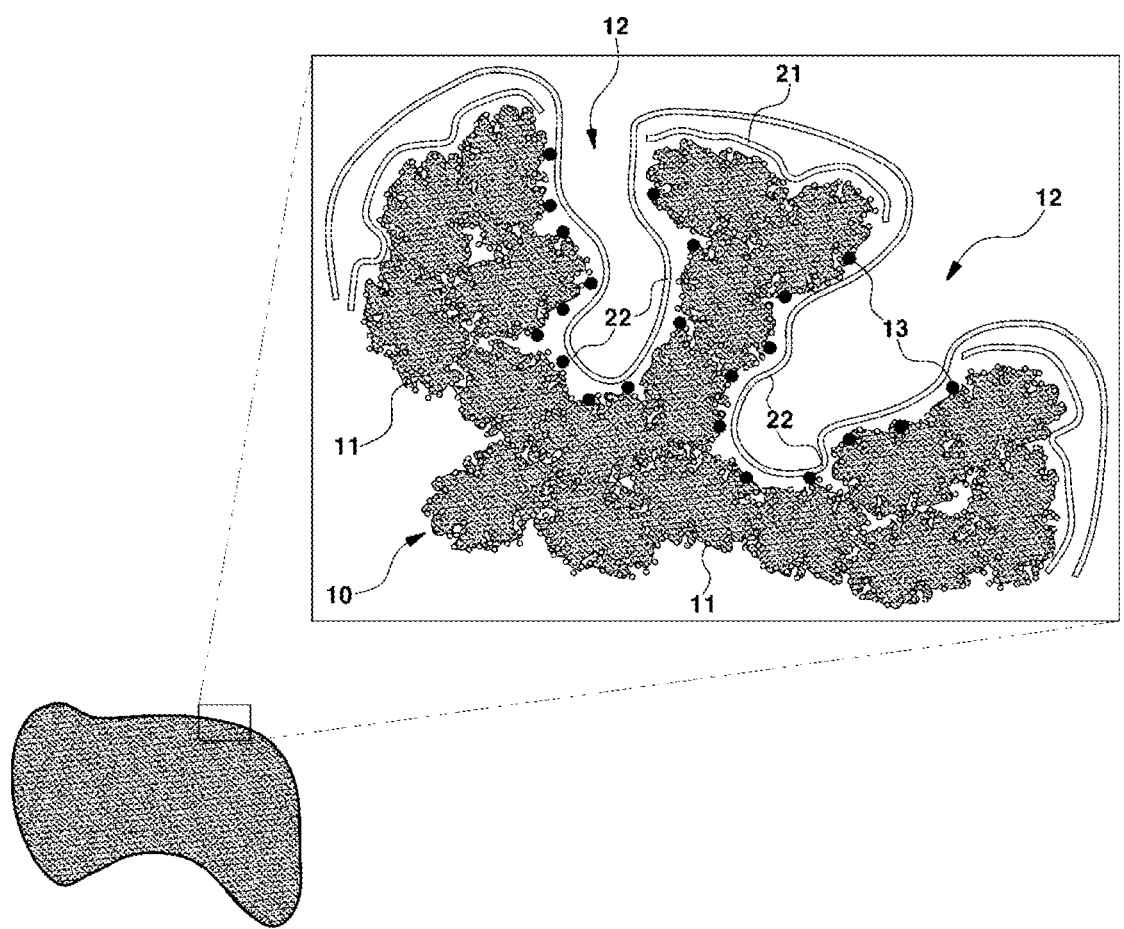
FIG. 2 is a view illustrating a catalyst slurry for fuel cells in accordance with the present disclosure.

FIG. 2 is a view illustrating a catalyst slurry for fuel cells in accordance with the present disclosure. Referring to FIG. 2, the catalyst slurry includes an electrode catalyst 10, into which catalyst particles 11 are agglomerated, and an ionomer layer 20 formed on the electrode catalyst 10.

Figure 3:
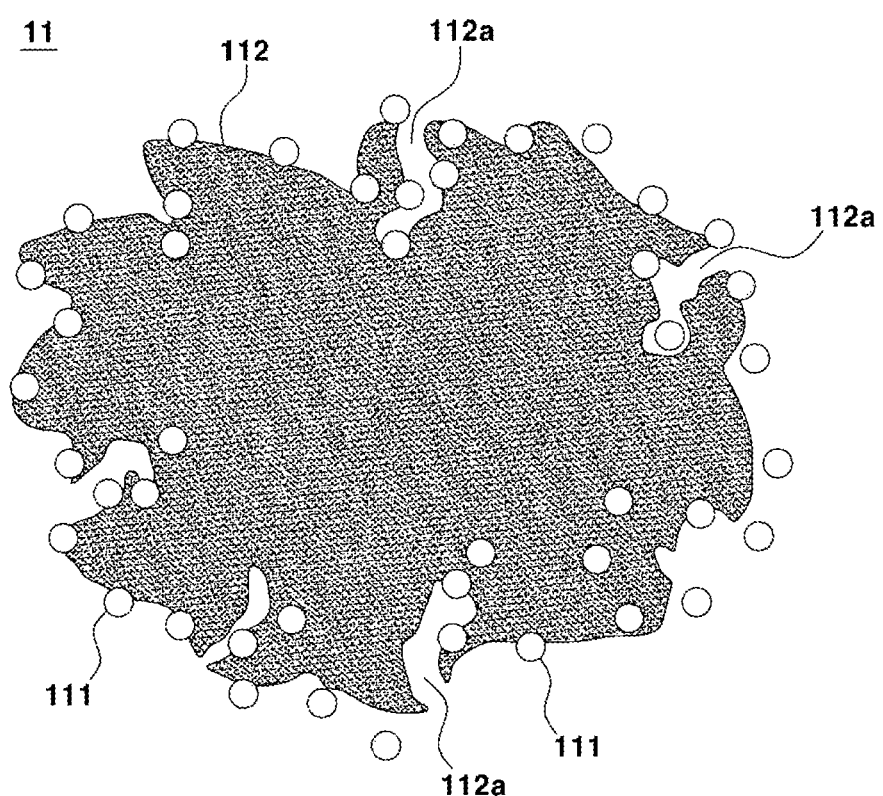
FIG. 3 is a view illustrating a catalyst particle of FIG. 2.

FIG. 3 is a view illustrating the catalyst particle 11. Referring to FIG. 3, the catalyst particle 11 may include a support 112 on which a catalyst metal 111 is supported.

The catalyst metal 111 may include one selected from the group consisting of platinum (Pt), palladium (Pd), iridium (Ir), rhodium (Rh), gold (Au), silver (Ag), cobalt (Co), nickel (Ni) and combinations thereof.

The support 112 may include one selected from the group consisting of carbon black, acetylene black, Ketjen black, active carbon, carbon nanotubes, carbon nanofibers, carbon nanowires and combinations thereof.

The support 112 may include micropores 112a having a size of less than 2 nm.

The catalyst particles 11 are not limited to any specific diameter and, for example, may have a diameter of 1 μm or less. Here, the diameter of the catalyst particles 11 may mean a distance from one point on the surface of a catalyst particle 11 to another point on the surface of the catalyst particle 11 which is opposite to the one point. When the diameter of the catalyst particles 11 exceeds 1 μm, formation of mesopores 12 in the electrode catalyst 10 which will be described later may not be easy.

Figure 4:
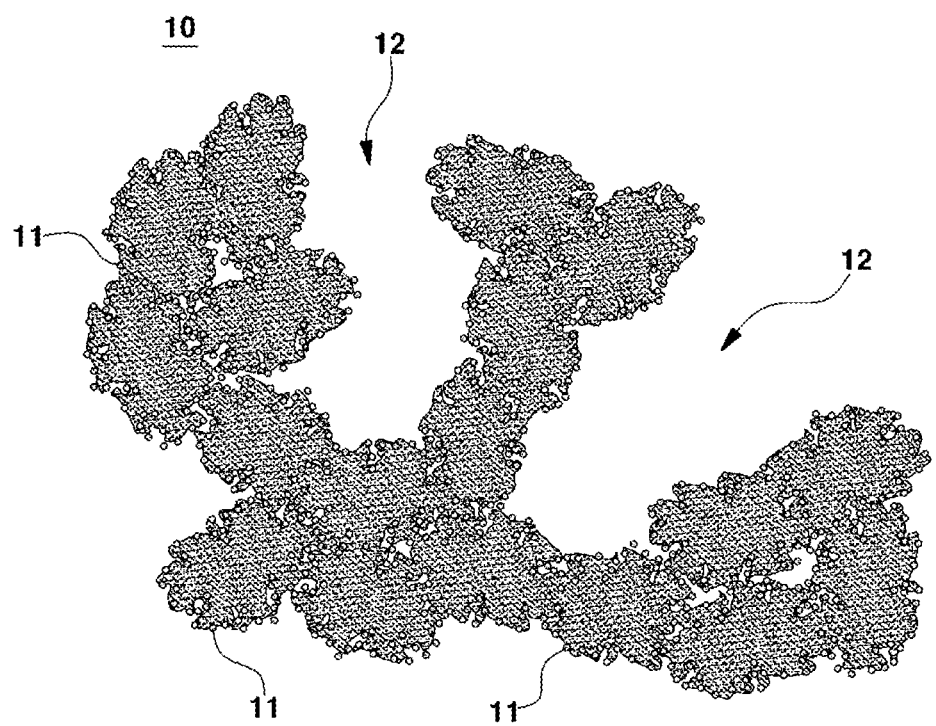
FIG. 4 is a view illustrating an electrode catalyst formed by agglomeration of the catalyst particles shown in FIG. 3.

FIG. 4 is a view illustrating the electrode catalyst 10 formed by agglomeration of the catalyst particles 11.

The electrode catalyst 10 may include an outer surface, and the mesopores 12 which extend inwards from the outer surface to a designated depth.

The mesopores 12 are not limited to any specific shape and, for example, may have a kind of channel shape, the cross-section of which is elongated inwards from the outer surface of the electrode catalyst 10, or a nearly hemispheric shape.

Specifically, the mesopores 12 may include pore inlets which are open from the inside to the outside of the electrode catalyst 10 so as to meet the outer surface of the electrode catalyst 10, a diameter of the pore inlets may be 2 nm to 50 nm, and a depth of the mesopores 12 may be 2 nm to 200 nm.

The mesopores 12 function as channels for discharging water generated during operation of a fuel cell. Therefore, an ionomer which is favorable from the aspect of water discharge may be located in the mesopores 12. On the other hand, the micropores 112a caused by the catalyst particles 11 and the support 112 are located in the outer surface of the electrode catalyst 10. The catalyst metal 111 is supported on the micropores 112a, and thus, an ionomer which has excellent proton conductivity rather than water discharge may be located in the micropores 112a.

Based thereon, in the present disclosure, as shown in FIG. 2, a first ionomer 21, which has a short average length of side chains and thus has a low equivalent weight (EW) and high proton conductivity, is configured to contact the outer surface of the electrode catalyst 10, and a second ionomer 22, which has a long average length of side chains and thus has a high equivalent weight (EW) and readily discharges water, is configured to contact the inner surfaces of mesopores 12.

In more detail, the first ionomer 21 may have an equivalent weight (EW) of 400 to 800, and include one selected from the group consisting of a polysulfone-based resin, a polyether ketone-based resin, a polyether-based resin, a polyester-based resin, a polybenzimidazole-based resin, a polyimide-based resin and combinations thereof. The first ionomer 21 has a short average length of side chains, and may thus effectively contact the catalyst metal 111 supported on the micropores 112a and have high proton conductivity. However, the first ionomer 21 has high hydrophilicity and is thus unfavorable from the aspect of water discharge.

The second ionomer 22 may have an equivalent weight (EW) of 800 to 1,200, and include one selected from the group consisting of a polysulfone-based resin, a polyether ketone-based resin, a polyether-based resin, a polyester-based resin, a polybenzimidazole-based resin, a polyimide-based resin and combinations thereof. The second ionomer 22 has long side chains, and thus has hydrophobicity and is favorable from the aspect of water discharge. However, contact of the second ionomer 22 with the catalyst metal 111 supported on the micropores 112a is low.

The electrode catalyst 10 may further include a water electrolysis catalyst 13 supported on the inner surfaces of the mesopores 12. The mesopores 12 serve as water discharge channels, as described above, and the support 112 may be corroded by moisture. The present disclosure aims to prevent this problem by applying the water electrolysis catalyst 13 to the inner surfaces of the mesopores 12.

The water electrolysis catalyst 13 is not limited to any specific substance, and may include, for example, a metal catalyst selected from the group consisting of iridium (Ir), ruthenium (Ru) and a combination thereof, or an oxide thereof.

The amount of the water electrolysis catalyst 13 which is supported on the inner surfaces of the mesopores 12 may be 10 parts by weight to 50 parts by weight based on 100 parts by weight of the electrode catalyst 10.

Figure 5:
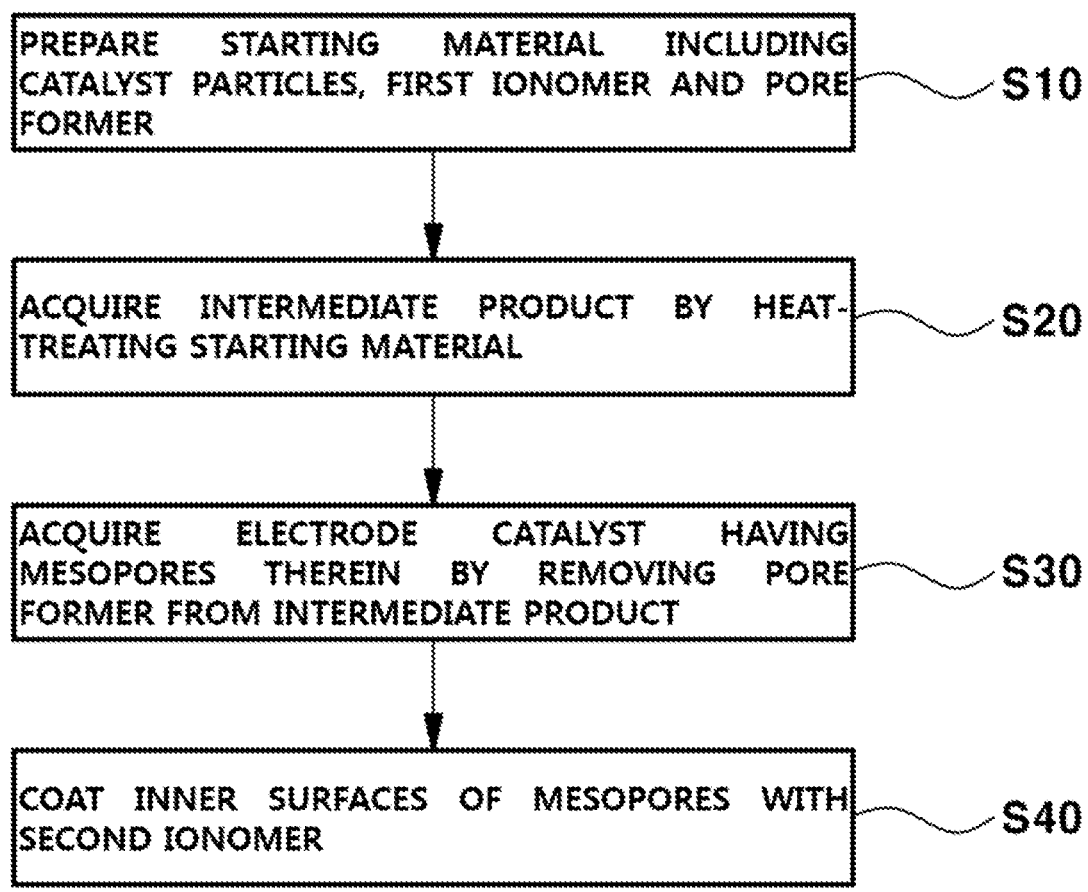
FIG. 5 is a flowchart representing a method for manufacturing the catalyst slurry in accordance with the present disclosure.

FIG. 5 is a flowchart representing a method for manufacturing the catalyst slurry in accordance with the present disclosure, and the method may include preparing a starting material including the catalyst particles, the first ionomer and a pore former (S10), acquiring an intermediate product, in which the outer surface of a composite including the catalyst particles and the pore former is coated by the first ionomer, by heat-treating the starting material (S20), acquiring the electrode catalyst having the mesopores therein by removing the pore former from the intermediate product (S30), and coating the inner surfaces of the mesopores with the second ionomer (S40).

The method is characterized in that the mesopores are formed in the above-described electrode catalyst and in this process; the ionomers are appropriately supplied so that the respective ionomers may be formed at necessary positions. Hereinafter, the method will be described in more detail.

Figure 6:
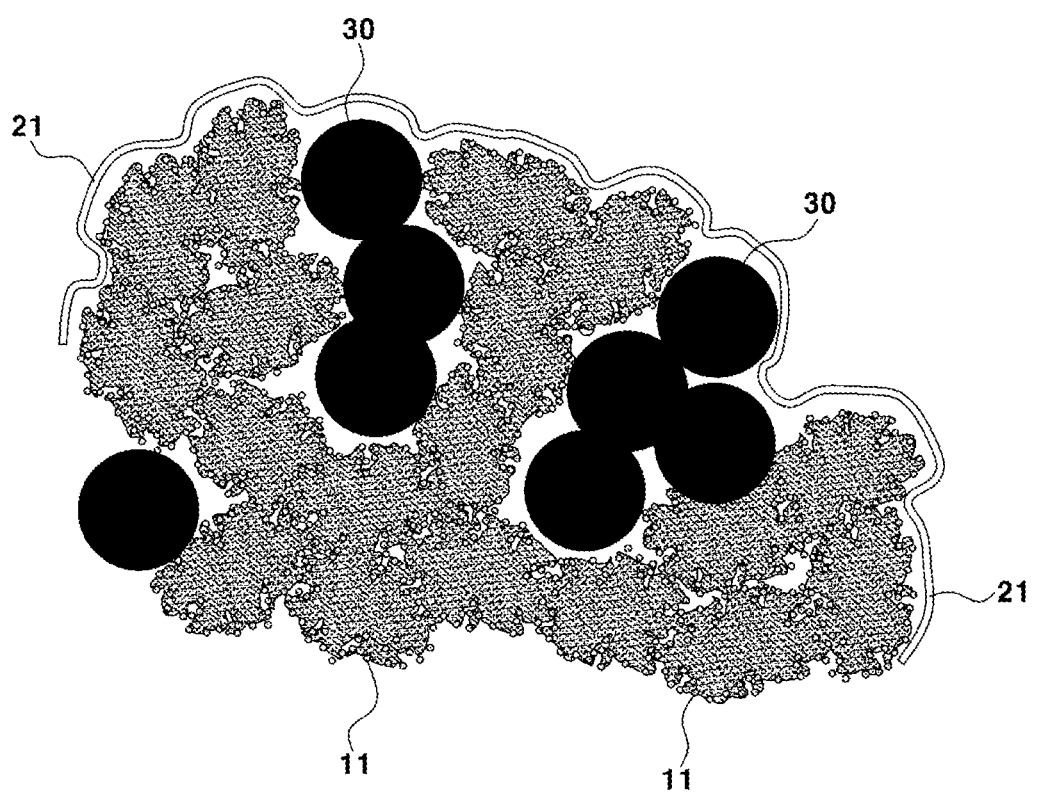
FIG. 6 is a view illustrating an intermediate product formed during the above method.

FIG. 6 is a view illustrating the intermediate product. The intermediate product may be acquired by heat-treating the starting material including the catalyst particles 11, the first ionomer 21 and the pore former 30.

The pore former 30 may include silica having a particle diameter of 5 nm to 50 nm. When the particle diameter of the pore former 30 is less than 5 nm, the size of the mesopores which will be formed is excessively small and thus it may be difficult to remove the pore former 30. On the other hand, when the particle diameter of the pore former 30 exceeds 50 nm, the size of the mesopores is excessively great and thus the number of the mesopores may be reduced and the specific surface area of the electrode catalyst may be lowered.

The content of the pore former 30 is not limited to any specific value and, for example, may be 10 parts by weight to 50 parts by weight based on 100 parts by weight of the catalyst particles 11.

Further, the starting material may include 60 wt % to 80 wt % of the catalyst particles 11 and the pore former 30 and 20 wt % to 40 wt % of the first ionomer 21. When the respective components are included within the above-described content ranges, mesopores having an appropriate size may be formed at an appropriate fraction.

In addition, the starting material may be prepared by dispersing the catalyst particles 11 and the pore former 30 in a solvent and then dispersing the first ionomer 21 in an acquired resultant material. This is to coat the outer surface of composite including the catalyst particles 11 and the pore former 30 rather than the inside of the composite with the first ionomer 21, as shown in FIG. 6.

The solvent is not limited to any specific substance, and may include, for example, one selected from the group consisting of distilled water, ethanol, propanol and combinations thereof.

The method may further include drying the starting material before heat-treatment of the starting material. Specifically, the starting material may be dried at a temperature of 60° C. to 90° C. for 12 hours or more using a dryer, such as an oven. When the drying temperature is excessively low, the solvent may not be sufficiently dried, and when the drying temperature is excessively high, the drying speed is too fast and thus the catalyst may ignite.

Thereafter, the intermediate product may be acquired by heat-treating the starting material at a temperature of 100° C. to 140° C. for 2 hours to 4 hours. When the heat-treatment temperature is lower than 100° C., the heat-treatment temperature is lower than the glass transition temperature Tg of the first ionomer 21 and thus the first ionomer 21 may not be properly fixed to the surface of the metal catalyst, and when the heat-treatment temperature is higher than 140° C., the structures of the ionomer and the catalyst may collapse due to excessive heat.

Figure 7:
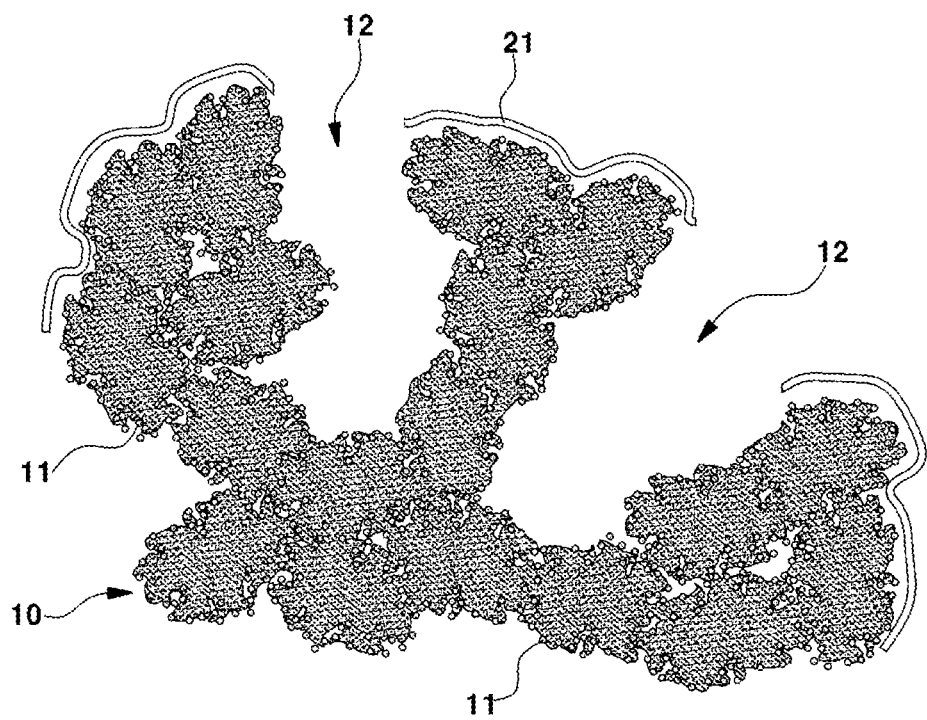
FIG. 7 is a reference view representing formation of mesopores by removing a pore former from the intermediate product.

Thereafter, the mesopores 12 may be formed by removing the pore former 30 from the intermediate product (S30), as shown in FIG. 7.

Specifically, the pore former 30 may be removed by putting the intermediate product into an alkaline solution and then refluxing an acquired mixture. Here, together with the pore former 30, the first ionomer 21 coated on the surface of the pore former is removed.

The alkaline solution may be acquired by dissolving a hydroxide of an alkali metal or an alkali earth metal in distilled water. Here, the alkaline solution having proper molarity may be manufactured so as to sufficiently dissolve the pore former 30. If particle-type silica is used as the pore former 30, the molarity of the alkaline solution may be in the range of about 3M to 10M.

Refluxing conditions may be, for example, that the alkaline solution into which the intermediate product is put is refluxed at a temperature of 50° C. to 95° C. for 2 hours to 5 hours, without being specifically limited.

The electrode catalyst having the mesopores 12 therein may be acquired by washing and drying the resultant material acquired by passing through the above operations. Here, the first ionomer 21 is coated on the outer surface of the electrode catalyst, as shown in FIG. 7.

Thereafter, the catalyst slurry in accordance with the present disclosure shown in FIG. 2 may be acquired by coating the inner surfaces of the mesopores 12 of the electrode catalyst with the second ionomer 22.

Specifically, the inner surfaces of the mesopores 12 may be coated with the second ionomer 22 by dispersing the electrode catalyst and the second ionomer 22 in a solvent.

The solvent is not limited to any specific substance, and may include, for example, one selected from the group consisting of distilled water, ethanol, propanol and combinations thereof.

At this time, the above-described water electrolysis catalyst 13 may also be put into the solvent so that the water electrolysis catalyst 13 is supported on the mesopores 12.

The catalyst slurry in accordance with the present disclosure may be used to manufacture an electrode for fuel cells. The manufacturing method of the electrode is not limited to any specific method, and the electrode may be acquired by coating a base material, such as a release paper, or an electrolyte membrane with the catalyst slurry using various methods, such as spray coating, bar coating, slot die coating, etc.

As is apparent from the above description, a catalyst slurry in accordance with the present disclosure may have excellent capability to discharge generated water and carbon corrosion durability.

Use of the catalyst slurry in accordance with the present disclosure may maximize a 3-phase boundary in an electrode.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

The invention claimed is:

1. A catalyst slurry for fuel cells comprising:
    an electrode catalyst formed as catalyst particles comprising micropores; and
    an ionomer layer formed on the electrode catalyst, wherein:
    the electrode catalyst comprises an outer surface, and mesopores formed to extend inwards from the outer surface to a designated depth;
    the ionomer layer comprises a first ionomer formed on the outer surface of the electrode catalyst in which the micropores are located, and a second ionomer formed on inner surfaces of the mesopores; and
    an average length of side chains of the second ionomer is longer than an average length of side chains of the first ionomer.

2. The catalyst slurry for fuel cells of claim 1, wherein the catalyst particles comprise a support on which a catalyst metal is supported.

3. The catalyst slurry for fuel cells of claim 2, wherein the catalyst metal comprises one selected from the group consisting of platinum (Pt), palladium (Pd), iridium (Ir), rhodium (Rh), gold (Au), silver (Ag), cobalt (Co), nickel (Ni) and combinations thereof.

4. The catalyst slurry for fuel cells of claim 2, wherein the support comprises one selected from the group consisting of carbon black, acetylene black, Ketjen black, active carbon, carbon nanotubes, carbon nanofibers, carbon nanowires and combinations thereof.

5. The catalyst slurry for fuel cells of claim 2, wherein the support comprises the micropores having a size of less than 2 nm.

6. The catalyst slurry for fuel cells of claim 1, wherein the catalyst particles have a particle diameter of 1 µm or less.

7. The catalyst slurry for fuel cells of claim 1, wherein the mesopores comprise pore inlets which are open from an inside to an outside of the electrode catalyst so as to meet the outer surface of the electrode catalyst, a diameter of the pore inlets is 2 nm to 50 nm, and a depth of the mesopores is 2 nm to 200 nm.

8. The catalyst slurry for fuel cells of claim 1, wherein the first ionomer has an equivalent weight (EW) of 400 to 800, and comprises one selected from the group consisting of a polysulfone-based resin, a polyether ketone-based resin, a polyether-based resin, a polyester-based resin, a polybenzimidazole-based resin, a polyimide-based resin and combinations thereof.

9. The catalyst slurry for fuel cells of claim 1, wherein the second ionomer has an equivalent weight (EW) of 800 to 1,200, and comprises one selected from the group consisting of a polysulfone-based resin, a polyether ketone-based resin, a polyether-based resin, a polyester-based resin, a polybenzimidazole-based resin, a polyimide-based resin and combinations thereof.

10. The catalyst slurry for fuel cells of claim 1, wherein the second ionomer is formed on the outer surface of the electrode catalyst in which the micropores are located.

11. The catalyst slurry for fuel cells of claim 1, wherein the electrode catalyst further comprises a water electrolysis catalyst supported on the inner surfaces of the mesopores,
wherein the water electrolysis catalyst is mixed with the second ionomer, and the water electrolysis catalyst comprises a metal catalyst selected from the group consisting of iridium (Ir), ruthenium (Ru) and a combination thereof, or an oxide thereof.

12. The catalyst slurry for fuel cells of claim 11, wherein an amount of the water electrolysis catalyst supported on the inner surfaces of the mesopores is 10 parts by weight to 50 parts by weight based on 100 parts by weight of the electrode catalyst.

13. A method for manufacturing the catalyst slurry for fuel cells of claim 1, the method comprising:
preparing a starting material including the catalyst particles, the first ionomer and a pore former;
acquiring an intermediate product, in which an outer surface of a composite comprising the catalyst particles and the pore former is coated by the first ionomer, by heat-treating the starting material;
acquiring the electrode catalyst having the mesopores therein by removing the pore former from the intermediate product; and
coating the inner surfaces of the mesopores with a water electrolysis catalyst and the second ionomer.

14. The method of claim 13, wherein the pore former comprises silica having a particle diameter of 5 nm to 50 nm.

15. The method of claim 13, wherein a content of the pore former is 10 parts by weight to 50 parts by weight based on 100 parts by weight of the catalyst particles.

16. The method of claim 13, wherein the starting material comprises 60 wt % to 80 wt % of the catalyst particles and the pore former and 20 wt % to 40 wt % of the first ionomer.

17. The method of claim 13, wherein the starting material is prepared by dispersing the catalyst particles and the pore former in a solvent and then dispersing the first ionomer in an acquired resultant material.

18. The method of claim 13, wherein the intermediate product is acquired by heat-treating the starting material at a temperature of 100° C. to 140° C. for 2 hours to 4 hours.

19. The method of claim 13, wherein the pore former is removed by putting the intermediate product into an alkaline solution and then refluxing an acquired mixture.

20. The method of claim 13, wherein the inner surfaces of the mesopores are coated with the second ionomer by dispersing the electrode catalyst, the water electrolysis catalyst and the second ionomer in a solvent.

\* \* \* \* \*